United States Patent [19]
La Fiandra et al.

[11] Patent Number: 5,535,043
[45] Date of Patent: Jul. 9, 1996

[54] REPLACEABLE ACTUATOR ASSEMBLY FOR OPTICAL MIRROR WITH KINEMATIC MOUNT

[75] Inventors: Carlo La Fiandra, New Canaan; Gon-Yen Shen, Brookfield, both of Conn.

[73] Assignee: Hughes Aircraft Company, Los Angeles, Calif.

[21] Appl. No.: 293,787

[22] Filed: Aug. 22, 1994

[51] Int. Cl.$^6$ .............................. C02B 26/08; C02B 5/08
[52] U.S. Cl. ...................... 359/224; 359/223; 359/846; 359/849
[58] Field of Search .................................. 359/223, 224, 359/846, 849

[56] References Cited

U.S. PATENT DOCUMENTS

| | | | |
|---|---|---|---|
| 4,705,365 | 11/1987 | Wakita et al. | 359/224 |
| 4,734,557 | 3/1988 | Alfille et al. | 219/121.74 |
| 4,861,149 | 8/1989 | Ealey | 350/611 |
| 4,923,302 | 5/1990 | Ealey et al. | 356/371 |
| 4,932,119 | 6/1990 | Ealey et al. | 29/593 |
| 4,940,318 | 7/1990 | Ealey et al. | 350/611 |
| 5,037,184 | 8/1991 | Ealey | 359/849 |
| 5,037,190 | 8/1991 | Ealey | 350/610 |
| 5,094,519 | 3/1992 | Ealey et al. | 359/845 |
| 5,172,277 | 12/1992 | Wahl et al. | 359/820 |

FOREIGN PATENT DOCUMENTS

| | | |
|---|---|---|
| 4138557 | 5/1993 | Germany . |
| 4206792 | 9/1993 | Germany . |

*Primary Examiner*—Paul M. Dzierzynski
*Assistant Examiner*—Darren E. Schuberg
*Attorney, Agent, or Firm*—W. C. Schubert; W. K. Denson-Low

[57] ABSTRACT

A deformable mirror device which includes a deformable face plate, a backing plate spaced from the deformable face plate, and at least one axially movable actuator which extends between the face plate and the backing plate. The actuator is fixed adjacent a first end to the backing plate and adjacent a second end, which is opposed to the first end, to the deformable face plate in a kinematic joint by reason of which no forces are transmitted in an ideal mating of the two components. At least a portion of the actuator may be disconnected and removed from the first end, and replaced by another actuator. The kinematic joint includes a high temperature, permanent, joint and a pair of spaced apart, low temperature, temporary joints. The high temperature joint is defined by a ball segment affixed to the deformable face plate as by frit. One of the low temperature joints is defined by an epoxy connection between the actuator at its first end and the backing plate. The other of the low temperature joints is defined by an epoxy connection between the actuator at its second end and the ball segment.

34 Claims, 7 Drawing Sheets

REPLACEABLE ACTUATOR ASSEMBLY FOR OPTICAL MIRROR WITH KINEMATIC MOUNT

FIELD OF THE INVENTION

This disclosure relates generally to optical mirrors, and more particularly to optical mirrors whose contour may be adjusted using an actuator array. The individual actuators in the array may be replaced if they are found to be defective. The actuators are mounted to a face plate of the optical mirror in a manner which provides precise positioning and minimum face plate distortion.

BACKGROUND OF THE INVENTION

Deformable optical mirror assemblies, including a face plate, are utilized in a variety of optical applications. These assemblies may be applied to both transmit and receive optical signals. In transmitting applications, after a correlated optical signal is produced by a laser or other photonic radiation emitting device, the correlated optical signal is reflected off the face plate of the optical mirror assembly. The face plate is controllably contoured such that the path of each component of the correlated optical signal (photon) is travelling in nearly the same direction as the others. Since virtually every photon of the optical signal is being transmitted parallel to each other, the photonic radiation can be transmitted over a very long distance (even up to many miles) with only minor reduction in the energy of the photonic radiation. These correlated optical signals can be utilized in transmitting information, as well as other applications.

In many applications where the mirror assemblies are located at the receiving end of the optical signals and the signals are being transmitted over relatively long distances, the waveforms of the correlated optical signal are corrected for transmission abnormalities by altering the shape of the face plate by using actuators. The shape of the waveforms is vital in controlling the content and/or energy of the transmitted signal. A very high percentage of all of the energy contained in the transmitted signal can be focused onto a relatively small area where a detector is located. Using deformable face plates, a weaker signal can be detected with the same precision as a stronger signal which is being reflected off the fixed face plate. This permits reliable signal transmission with less energy required to generate the signals.

One such optical mirror assembly is described in greater detail in the Detailed Description portion of this disclosure. This optical mirror assembly is relatively expensive to produce since many of the components are produced individually. The cost of such a complete, full sized, optical deformable mirror assembly can be over a million dollars. An expensive repair situation is presented when one or more actuators in the actuator array becomes disabled or malfunctions. There is no technique which permits replacement of the actuators with relative ease. When an actuator is found to be inactive in this embodiment that actuator is disabled. This results in not being able to adjust a small portion of the deformable face plate of the optical mirror assembly. As additional actuator assemblies become non-functional within a single system, the adjustability of the mirror as well as the benefits associated with having an adjustable or controllable optical mirror assembly quickly diminishes.

The actuators used in deformable optical mirror assemblies are required to cycle at an extremely rapid rate (at the magnitude of one thousand Hertz) since the optical mirror assembly contour must be precisely adapted to adapt to optical waveforms which change on a regular basis with each optical wave cycle. Therefore, during normal operation of the optical mirror assembly, individualized actuators usually cycle at a rapid rate. When one or more actuator assemblies are disabled, the ability of the face plate to compensate for deformed waveforms is reduced.

Figure 1:
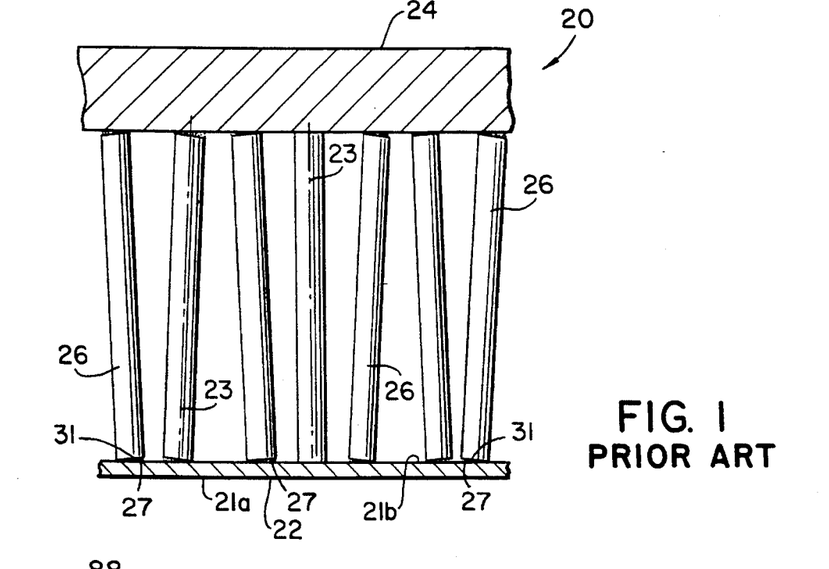
FIG. 1 is a partial cross-sectional view of a prior art deformable mirror assembly.

Another disadvantage of the optical mirror assembly illustrated in FIG. 1 is that it is difficult to mount the actuator assemblies to the face plate in a precise kinematic manner as defined in the Detailed Description. The portion of the actuator which mounts to the face plate itself is typically a flat surface affixed to the face plate by adhesive such as epoxy. Also, it is very difficult to mount the actuators precisely parallel to each other. This creates some inaccuracy as to where each actuator is mounted to the face plate. Such inaccuracy in mounting position causes uncertainty in displacement of each actuator to provide desired face plate deformation. Additionally, when the actuators are not parallel to each other, the flat surfaces of the actuators mounted to the face plate cannot be parallel to (flush with) the face plate. As the actuators cycle with respect to each other, those actuators with a flat surface which is not precisely flush with the face plate provide a lateral force to the face plate when actuated. When the actuators are not parallel to each other, the lateral forces do not match, resulting in high cycling stresses being applied to the face plate itself. These stresses may result in an undesirable deformation in the face plate. It is also likely that during the actuator mounting process a continual lateral force can be created between the actuator and the face plate. Such force will likely produce undesirable deformations in the face plate.

Prior art patents which illustrate prior art removable face plate actuators include U.S. Pat. No. 4,923,302, which issued May 8, 1990 to Ealey et al.; U.S. Pat. No. 4,940,318, which issued Jul. 10, 1990 to Ealey et al.; U.S. Pat. No. 5,037,184, which issued Aug. 6, 1991 to Ealey; U.S. Pat. No. 5,037,190, which issued Aug. 6, 1991 to Ealey et al. (all of these patents being incorporated by reference in their entireties). These patents utilize screw threads to adjustably mount the actuators with respect to the face plate. There are several inherent limitations to using screw threads in mounting actuators.

A first limitation is due to the difficulty in achieving precise axial positioning of the actuators. It is very difficult to control axial positioning of actuators using screw threads where rotation of the actuators cause uncertain axial deflection. Uncertainty results from the screw threads having inherent hysteresis which is difficult to account for. A second limitation with screw mounted actuators is that the location where the actuator mounts to the face plate is difficult to precisely control since the actuator mounting holes may be out of skew, or the threads on the actuators may be incorrectly aligned. Screw threads are overly constraining as to the lateral positioning of the actuator with respect to the face plate. A third problem with screw thread mounted actuators is that, after considering the above two problems in which the actuators are being positioned in same undesired location, there may also be undesirable forces created between the actuator and the face plate. Such forces create deformations in the face plate which have to be compensated for or the overall accuracy of the optical mirror assembly is compromised. As a result, screw thread mounted actuators of the Ealey and the Ealey et al. patents do not truly represent a kinematic mount between the actuators and the face plate.

The above undesirable aspects of the screw thread mounts for actuators can be somewhat overcome by providing a relatively loose screw mount. There are some negative results in providing loose screw mounts to the actuator, however. A loose screw mount permits some play in the front of the actuator with respect to the backing plate. This is because loose screw mounts provide only limited control of positioning where the actuator contacts the face plate. A complex and involved process is involved where a skilled technician that is inserting (either manually or using a tool) the actuator must precisely position the actuator with respect to the loose screw mount. Loose screw mounts of also permits unscrewing of the actuator from its mount during the high frequency operation of the mirror assembly. An additional undesirable effect of using loose actuator screw mounts is that they provide an undesirable low spring constant between the actuator and its screw mount in all three directions, and about all three axes. It is desirable to build in high spring constants to achieve high natural frequencies out of the range of intended operation.

From the above, it can be appreciated that it is desirable to provide some configuration of optical mirror assembly in which at least certain actuators may be readily replaced as they become defective. It is also desirable to provide some technique by which actuators may be affixed to the face plate of the mirror assembly to reduce the stresses and deformations applied to the face plate. Additionally, it is desirable to provide an actuator mount configuration by which the location at which the actuator contacts the face plate can be controlled.

SUMMARY OF THE INVENTION

The foregoing and other problems are overcome by a deformable mirror device which includes a deformable face plate, a backing plate is adjacent to the deformable face plate, and at least one axially extendable actuator. The axially extendable actuator is axially fixed at a first end to the backing plate and fixed at a second end, which is opposed to said first end, to the deformable face plate by a kinematic mount. At least a portion of the axially extendable actuator may be removed from the assembly and replaced by another actuator.

The actuator is attached to the backing plate by a suitable means such as epoxy. The actuator is attached to the face plate by a series of components which intersect such as either a line contact or an area contact. This configuration maximizes the spring constant of the actuator, so that any expansion or contraction of the actuator is more positively applied as a deflection between the face plate and backing plate.

BRIEF DESCRIPTION OF THE DRAWINGS

The above set forth and other features of the invention are made more apparent in the following Detailed Description of the Invention when read in conjunction with the attached Drawings, wherein.

DETAILED DESCRIPTION OF THE INVENTION

In this disclosure, elements which perform similar functions in the different embodiments are provided with identical reference characters.

FIG. 1 illustrates the general outline of a prior art mirror assembly 20. The mirror assembly includes a deformable face plate 22. The deformable face plate has a front or mirror side 21a which is configured to reflect photonic radiation, and a back side 21b to which other members are attached for applying pressure to deform the face plate. The mirror assembly of FIG. 1 also includes a rigid backing plate 24 and a plurality of actuators 26. Each of the actuators 26 is configured to be axially extendable to control the contour of the deformable face plate 22. Axial extension and/or contraction of each of the actuators has the effect of bending the deformable face plate 22. This provides a mirror assembly 20 with a mirror side 21a whose contour is controllable.

Present Invention

Figures 2A, 2B:
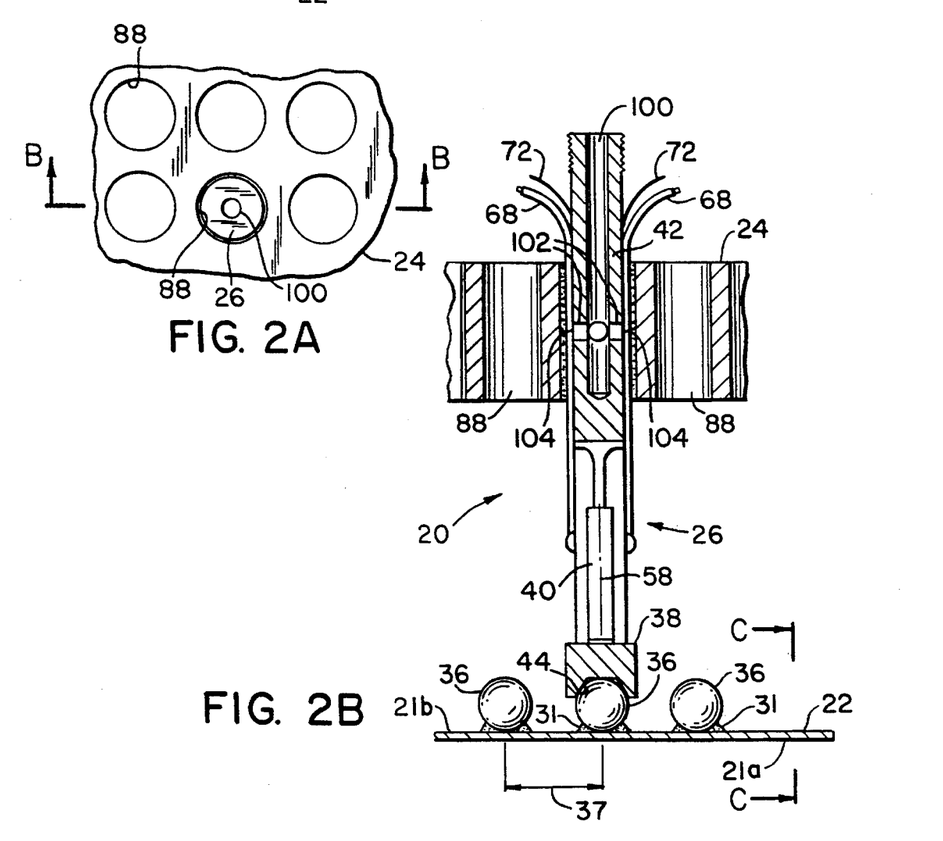
FIG. 2A is a top view of a preferred embodiment of deformable mirror assembly using the present invention, with only one actuator in its final mounted position.
FIG. 2B is a partial cross sectional view taken through sectional lines B—B of FIG. 2A.

Major distinctions between the prior art deformable mirror assembly 20 as illustrated in FIG. 1, and the FIG. 2B present invention embodiment of the deformable mirror assembly is described below.

FIG. 2A is a top view of one embodiment of mirror assembly 20 of the present invention. Only one of the actuators 26 is in place in FIG. 2A. FIG. 2B is a partial cross sectional view of actuator 26 taken along sectional lines B—B in FIG. 2A.

The deformable face plate 22 of FIG. 2B is fabricated from a thin substrate using such materials as silicon, zerodur, ultra-low expansion glass (ULE), super invar, or invar. The face plate 22 is fabricated to be flat, but not necessarily parallel, on both the front side 21a and the back side 21b. The fabrication of the mirror assembly 20 produces a deformable face plate 22 of the desired cross section. This may be quantified such that the face plate is preferably not exposed to any figure error (i.e. the face plate is formed in its desired cross sectional configuration with limited troughs and ridges). The front side 21a of any face plate that is being considered for use in the mirror assembly should have a spatial frequency (i.e. a maximum number of ridges or troughs which are formed in any given direction over a given distance divided by said distance) that is greater than a typical spacing, taken in a direction parallel to the front side 21a.

An array of the ball segments 36 are preferably heat bonded, using frit 31, to the back side 21b. Frit is a well known material used for adhering objects to ceramic substances, and is not described herein. The frit 31 produces a bond having an area contact between the face plate 22 and the ball segment 36 which exhibits a low spring constant. In general, in actuators for mirror assemblies, it is desired to have as low a spring constant as possible so that almost any movement of the actuator is applied directly and predictably to the face plate.

Each actuator assembly in the embodiment illustrated in FIG. 2B includes a socket portion 38 which couples to ball segment 36; a stack portion 40 which is preferably formed of piezoelectric, electrostrictive, magnetostrictive, or other similar material and provides the axial extension and contraction capabilities of the actuator 26 upon application of electricity; and a cylinder portion 42 which couples the rest of the actuator to the backing plate 24 in a manner described below.

The ball segments 36 illustrated in FIG. 2B are preferably spherical balls, but can take any suitable shape which is capable of performing its intended function. It is preferable that a relatively long (preferably circular or elliptical) line contact 46 (see FIGS. 3A, 3B, 3C) be established between the recess 44 of the socket portion 38 and a portion of the ball segment 36. Such line contact is provided if the ball segments 36 are cylindrical, semi-spherical with the flat portion of the semi-spherical structure contacting the back side 21b of the face plate 22, conical, or a variety of other shapes. This line contact configuration provides a very low spring constant between the ball segments and the face plate.

The ball segment is connected to both the actuator and the face plate when installed. The three connections include the frit 31 between the ball segment 36 and the face plate 22; an epoxy connection between the ball segment 36 and the socket connection 38, an epoxy connection between 38 and the actuator 26, an epoxy connection between 26 and 40, and an epoxy connection between the cylinder portion 40 and the backing plate 24, which combine to form what is referred to in this specification as a kinematic joint. The term "kinematic joint" is defined as any joint which is non-overconstraining and thus stress and strain limited. Since a kinematic joint is used in the present invention, the accuracy of where, on the face plate, each actuator (in the array) is to be mounted, can be controlled with greater precision. This results in a more regular spacing of the attachment of the actuators to the face plate. The kinematic joint also provides a larger area of contact than in the FIG. 1 prior art embodiment, where many of the actuators are likely to be angled resulting in only a point contact being formed between the actuator and the back side 21b of the face plate 22. The increased area of contact of the present invention, as well as the more precise actuator/face plate positioning, results in lower stresses being applied to the face plate, and a higher spring rate of the actuator/face plate combination. It is also preferably characterized by resulting in relatively small lateral forces or moments occurring within the joint when the actuator is in its neutral position while little compressive or expansive force is being exerted by the actuator. The term "lateral" is defined as a direction generally parallel to the back side 21b of the face plate. In the prior art Ealey and Ealey et al. patents described in the Background, for example, the threaded connection between the actuators and the mirror assembly is not a kinematic joint since it is likely to produce considerable lateral forces between the actuator and the face plate, resulting in mirror distortions which might not be correctable.

In typical applications, the mirror assembly 20 includes a large array of actuators which control displacement of the face plate of a mirror assembly. Considering the large number of actuators (e.g. 1000) (and the corresponding relatively small area where each actuator applies forces and moments to the back side 21b), providing a kinematic connection between each actuator and the face plate as well as the actuator and the backing plate becomes especially important. By doing so, considerable unexpected deflections and stresses in the face plate are limited. This compares to the previously mentioned Ealey patents with the screw mounted connections. Since screw mountings have an inherent low spring constant, the actuators of these systems cannot provide a kinematic joint or connection between the face plate and the backing plate, nor have high stiffness necessary to achieve high system natural frequencies out of the operating range of the mirror (typically 1,000 Hertz).

Figure 7:
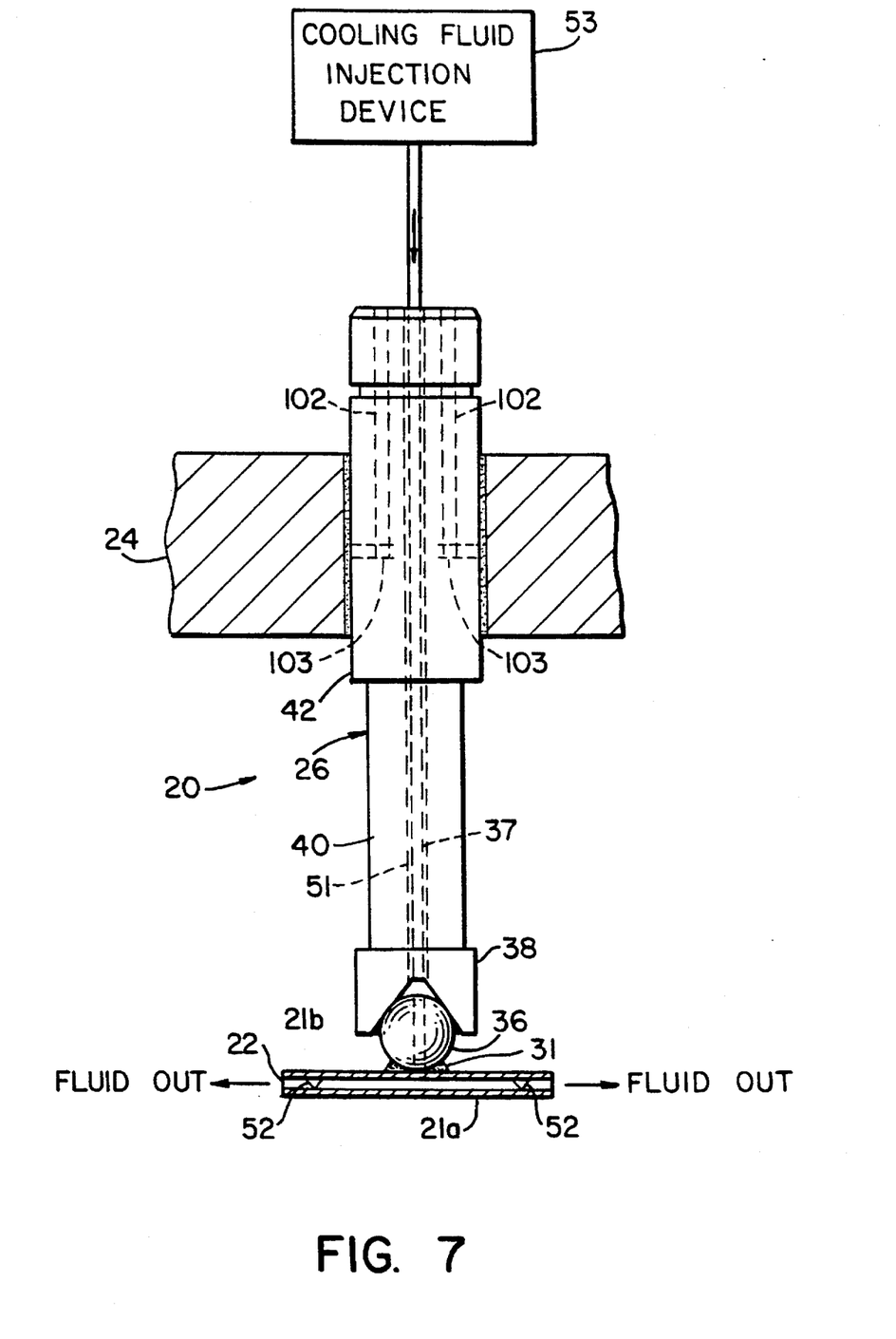
FIG. 7 is an a partial cross sectional view of an alternate embodiment of actuator assembly, from that illustrated in FIG. 2B, which further includes a cooling channel.

Turning to FIG. 7, there may be a cooling channel 51 which extends through the actuator and the ball segment 36. The actuator has a tube 37 inserted in its hole to prevent the cooling fluid from touching its inner surface. Cooling fluid is applied, under pressure, from a cooling fluid injection device 53 into the cooling channel 51. Cooling fluid (such as water or any other suitable cooling medium) is injected though the cooling channel 51 and disperses through a cooling recess 52 formed between the front side 21a and the back side 21b of the face plate 22. This configuration is applied when excessive heat is generated in the mirror assembly 20 such as from a high energy laser beam.

Assembly Process

Figure 4A:
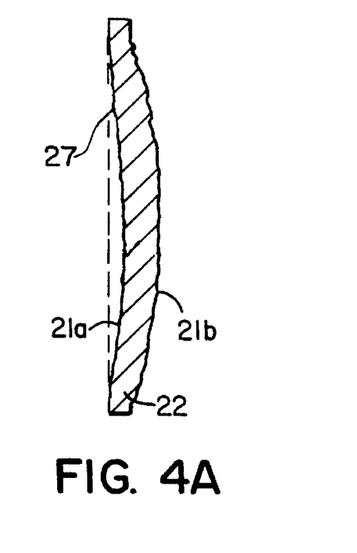
FIG. 4A is an side cross sectional view of a face plate of the type which may be used in the present invention, as taken through section lines C—C of FIG. 2B.
Figure 4B:
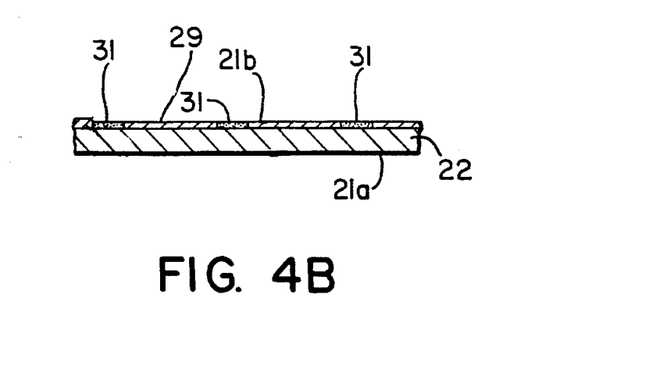
FIG. 4B is a partial section of the face plate of FIG. 4A additionally showing frit being applied using a silk screening process.

The preferred process of producing the mirror assembly 20 shown in FIG. 2B is illustrated in FIGS. 4A–4K. The process begins with fabricating a face plate 21 as shown in FIG. 4A. The face plate 21 of FIG. 4A is as taken along section lines C—C of FIG. 2B. Next, as shown in FIG. 4B, frit is applied to the back side 21b such as by using silk screen techniques. The number and layout of openings in the silk screen correspond directly to the number and layout of the ball segments 36 which are to be attached to the back side 21b. There are two variables involved in the silk-screen process which controls the application of the frit 31 to the back side 21b. The first variable is the diameter of each aperture formed in the silk screen. This diameter should preferably correspond almost identically to the diameter of frit which remains on the back side 21b after the frit process in completed. The second variable is the width of the silk screen material. A thicker silk screen material will generally produce a thicker layer of frit 31. The silk screen variables can be altered empirically until frit of the desired dimension is obtained. The cured thickness and shape of the ball-back of the face plate interface is specifically controlled to impart the desired correct characteristics of stiffness to this joint.

Figure 4C:
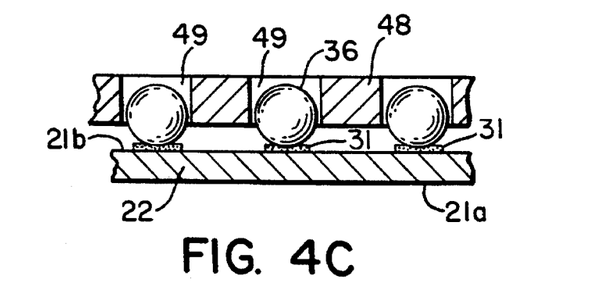
FIG. 4C is a partial section of FIG. 4B, additionally showing a frit rig 48 placed adjacent the face plate which is being used to apply ball segments 36 thereto.

After the desired frit is laid down on the back side 21b of the deformable face plate 21b, a frit rig/jig 48, as illustrated in FIG. 4C, is positioned directly above the back side 21b. The frit rig/jig 48 has cylindrical, or frusto-conical, openings 49 whose locations correspond directly to the desired ball segments 36 with respect to the back side 21b. The diameters of the openings 49 are slightly larger than the diameter of the corresponding ball segments 36 such that the user may position the ball segments directly within the openings 49, and gravity pulls the ball segments downward within the cylindrical openings until they are in contact with the frit 21 located on the back side 21b. The application of frit is performed at elevated temperatures. As soon as the ball segments 36 have all been positioned within the respective cylindrical openings, the temperature is reduced and the frit solidifies to form a frit joint between the ball segments and the face plate. When the frit joint solidifies, the frit rig is removed and the ball segments 36 are securely affixed to the back side 21b. The ball material is matched to the frit as well as the back plate material to obtain an optimum joint from a thermal/fabrication point of view also.

One major advantage of using the frit rig/jig 48 is that the ball segments 36 can be precisely positioned with respect to the back side 21b. Any expansion or contraction force from the actuator 26 is applied to the face plate directly through the respective ball segment 36 with a high spring constant, resulting in minimal hysteresis. Therefore, the fabricator of the mirror assembly knows where the forces from the actuator are being applied to the face plate. By comparison, locating the positions of where the actuators in the FIG. 1 prior art configuration contact the face plate depend upon the axis 23 of the actuators. Unfortunately, the axis 23 of the actuators 23 cannot be precisely controlled. In the present invention, one or more axes of the actuator can be offset from the desired orientation somewhat, and since the socket portion 38 still contacts the ball segment with a circular line contact, a stiff, kinematic joint is maintained. Similarly, the location where the actuator mates with the mirror in the prior art Ealey patents depends upon the threaded connection between the actuator and the backing plate. As previously described, the threaded connection provides relatively imprecise locating of the actuator with respect to the face plate. In addition, stressed screw threads move and shift position in the micro movement regime.

Figure 4D:
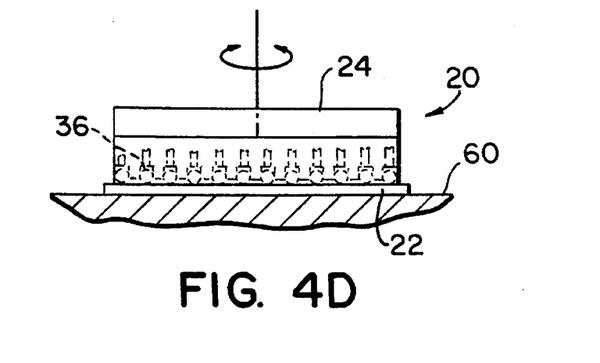
FIG. 4D is the face plate of FIG. 4C, with the frit rig 48 removed, and with a front side of the face plate being polished.

In FIG. 4D, the front or mirror side 21a of the deformable face plate 22 is polished in a continuous polishing machine to remove any deformations which may have resulted from the processes illustrated in FIGS. 4B and 4C. Even though the front side 21a of the face plate 22 is polished prior the application of the ball segments, the application of the frit to the face plate, and the exposure of the face plate to elevated temperatures may provide thermal deformations which could distort the front side 21a of the face plate 22. The polishing process of FIG. 4D, which reduces any such thermal deformations, is accomplished by applying a polishing device 60 to the front side 21a.

Figure 4E:
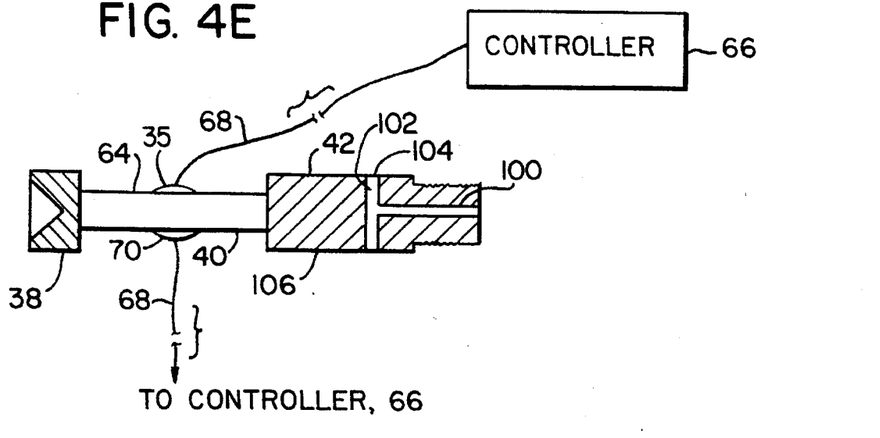
FIG. 4E is a partially cross sectional view of the actuator assembly illustrated in FIG. 2B.
Figure 4F:
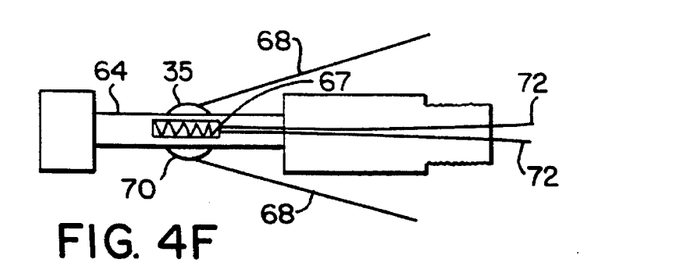
FIG. 4F illustrates the actuator of FIG. 4E, with strain gages applied thereto.
Figure 4G:
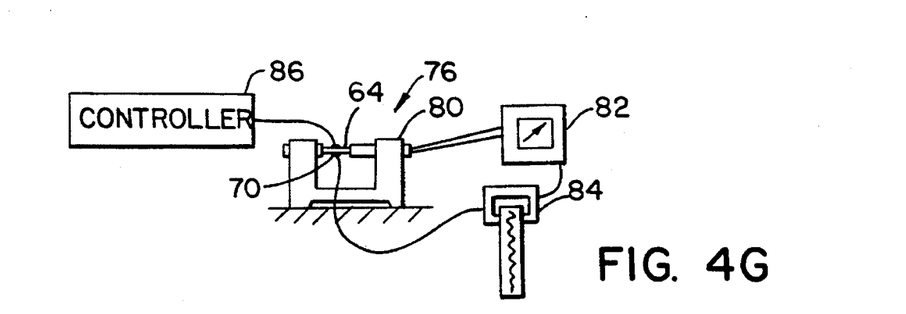
FIG. 4G is the actuator of FIG. 4F, undergoing calibration in a calibration device 76.
Figure 4H:
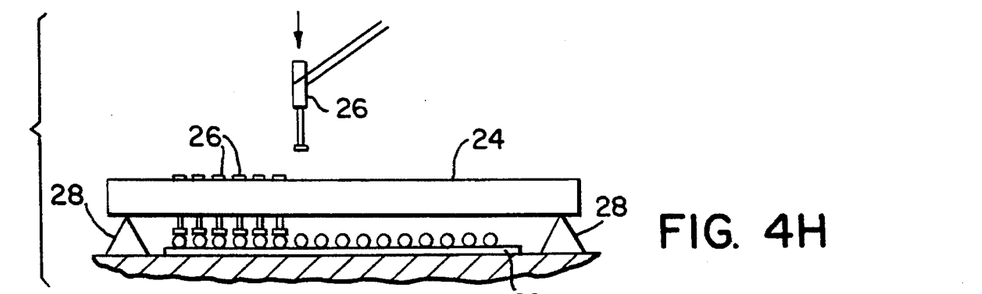
FIG. 4H is the face plate of FIG. 4D, with a backing plate 24 being spaced from the face plate, and a plurality of actuator assemblies such as shown in FIG. 4G being inserted into the cylindrical apertures 88 formed in the backing plate 24.
Figure 4I:
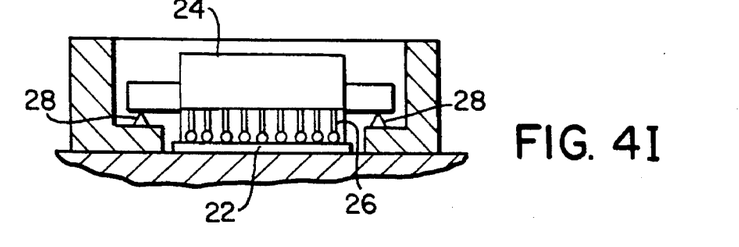
FIG. 4I is a partial cross sectional illustration of the FIG. 4H face plate being polished.
Figure 4J:
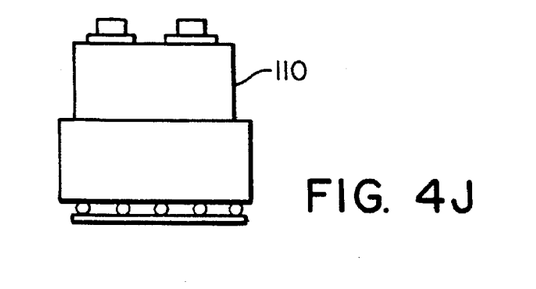
FIG. 4J is a schematic illustration of the FIG. 4I face plate, with an electrical connector portion 110 being connected to the face plate.
Figure 4K:
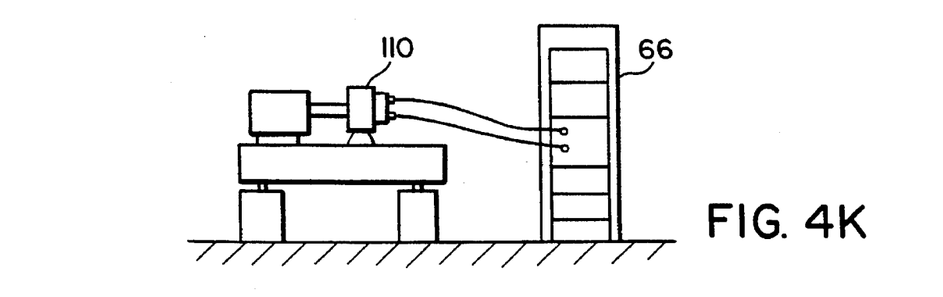
FIG. 4K is a schematic illustration of the FIG. 4J face plate with a controller 66 being applied to the electric connector portion 110.
Figure 4L:
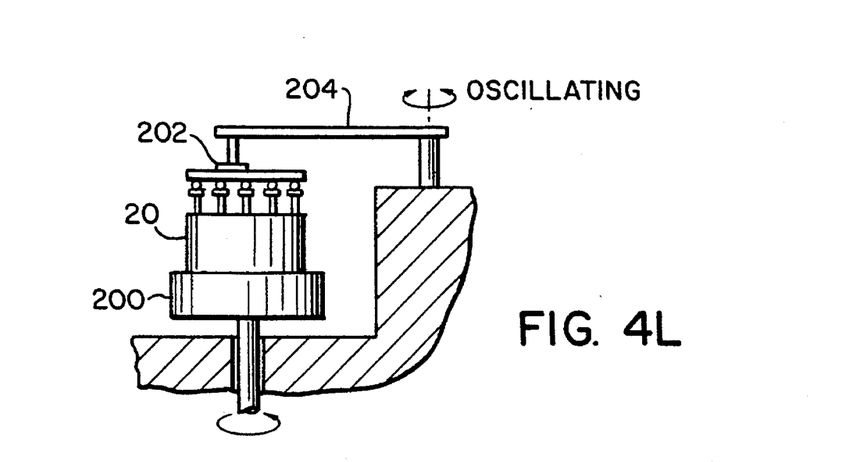
FIG. 4L is an alternate device to polish the FIG. 4H face plate from that illustrated in FIG. 4D.

FIG. 4L shows an alternate means of accomplishing this polishing process using a conventional optical polishing spindle machine. In FIG. 4L, the mirror assembly 20, as assembled to this point, is positioned on a rotary spindle 200, with the front side 21a facing away from the spindle. A polishing tool 202 is mounted in contact with the front side 21a. The polishing tool 202 is secured by an oscillating tool holder 204. The oscillating tool holder 204 displaces the polishing tool into and out of the page as illustrated in FIG. 4L. This oscillation is accomplished as the mirror assembly 20 is rotating at a rapid rate on the spindle 200. In this manner, the entire front side 21a is polished. Alternately, any other suitable technique to polish the front side 21a is within the scope of the present invention.

FIG. 4E shows the construction of the actuators 26 in greater detail. Each actuator 26, as shown in FIG. 2B, consists of the socket portion 38, the stack portion 40, and the cylinder portion 42. The stack portion 40 is preferably formed as a piezoelectric or electrostrictive driver. The piezoelectric driver is actuated by applying variable electric voltages to alternating layers of piezoelectric material. Insulators are located between the alternating layers (neither the layers of the piezoelectric material nor the insulators are illustrated). In brief, piezoelectric drivers expand and contract along a desired axis in proportion to the strength of an electric signal which is applied thereto. The structure and operation of the piezoelectric drivers are well known, and are not further detailed herein. Piezoelectric drivers, as well as the other components of the actuators 26, may be formed in a wide variety of sizes. It is preferred that the actuators 26 be configured in an array in which the adjacent actuators are spaced as closely to each other as possible, without contacting each other during any reasonably expectable operation of the mirror assembly. The spacing 34 between adjacent actuators 26 define the minimum spatial frequency of the waveform which the mirror assembly 20 is capable of properly assuming.

A suitable electronic system associated with the actuators 26 produces a controlled application of voltage to the piezoelectric driver 64; this results in the actuation of the piezoelectric driver 64 of the actuator segment 62. Actuation of the piezoelectric driver displaces the face plate with respect to the backing plate 24. This is caused by the lengthening or shortening of the piezoelectric driver as suitable electrical signals are applied to the piezoelectric driver. This electronic system is useful for proper operation of all embodiments of the actuators 26 whose motion is based upon the piezoelectric driver 64, or some other suitable electro-mechanical device. A controller 66 controls the application of electric voltage (via conductors 68) to each of the piezoelectric drivers 64 individually.

Another type of electronic device which may be associated with the actuators 26 is a strain gage 70. The strain gage functions as a motion transducer in a well known manner. Any other type of suitable motion transducer may be utilized in this application as well. The strain gage is affixed to the piezoelectric driver 64 to sense expansion or contraction of the piezoelectric driver 64 as illustrated in FIG. 4F. The value of the motion detected by the strain gages associated with multiple actuators is translated into electrical signals which are fed into the controller 66 via a conductor 72. The result of using this piezoelectric device with the strain gage feedback is to have a system that has no hysterisis. The piezoelectric driver 64 and the strain gage 70 are calibrated for detecting motion using a calibration device 76. The calibration device, as illustrated in FIG. 4G, includes a mount portion 80 for securely mounting the piezoelectric driver 64, a capacitive or equivalent gage 82 for detecting resultant displacement of the piezoelectric driver 64, a read-out portion 84 for displaying the displacement, and an electric controller 86 for applying electrical signal of known voltages to the conductor 68.

Figure 3A:
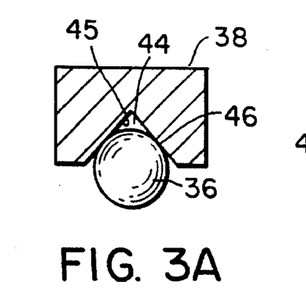
FIG. 3A is a partial cross sectional view of one embodiment of the socket portion 38 illustrated in the FIG. 2B embodiment.
Figure 3B:
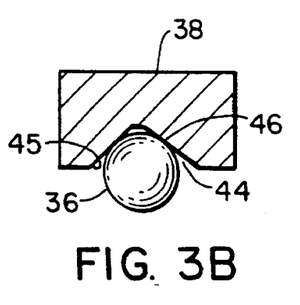
FIG. 3B is a partial cross sectional view of another embodiment of socket portion 38 illustrated in FIG. 2B embodiment.
Figure 3C:
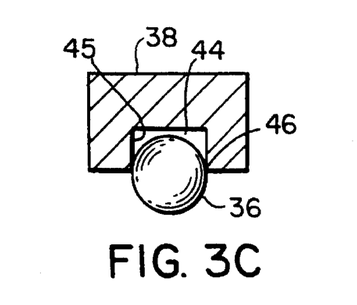
FIG. 3C is a partial cross sectional view of a final embodiment of socket portion 38 illustrated in FIG. 2B embodiment.

The socket portion 38 of each actuator segment 62 is affixed to its corresponding ball segment 36 as illustrated in FIG. 4H in the following manner. Initially, the backing plate 24 is positioned substantially parallel with respect to the face plate 22 using spacer elements 28. The backing plate 24 of FIG. 2B has an array of cylindrical apertures 88 formed therein whose layout coincides with the placement of the array of ball segments 36 affixed to the face plate 22. Different embodiments of the socket portion 38 are illustrated in FIGS. 3A–3C. The cylindrical apertures are slightly larger in diameter than the corresponding ball segments 36 of the actuators 26 which are configured to fit therein. The difference in diameter between the cylindrical portion 42 and the cylindrical aperture 88 permit some tilting of the axis 58 of the actuator 26 with respect to the back side 21b during mounting of the actuator. This tilting of the axis 58 compensates for slight misalignments between the actuator segment 62 and the ball segment 36, while still permitting the suitable circular line contact 46 between the wall 45 of the recess of the socket portion 38 and the ball segment 36. Even with the tilting of the axis, and the associated mounting process, a kinematic joint is thereby provided.

A charge of epoxy (the volume of the charge is determined based upon the configuration of the recess 44 of the socket portion 38—see FIGS. 3A–3C) is inserted into the recess 44 prior to the mounting of the actuator 26 into the cylindrical aperture 88. Each actuator 26 is then inserted through the cylindrical aperture 88 using an insertion rig 90, as described below, until the ball segment 36 forms the circular line contact within a wall 45 of the recess 44. For this line contact to be maintained, the epoxy hardens to form a joint between the ball segment 36 and the wall 45 of the recess 44. The ball segment 36—wall of socket 44 joint is especially useful in the present application because, regardless of the angle 56 at which an axis 58 of the actuator makes with the back side 21b, a precise circular line contact between the socket portion and the ball segment is formed. This precise circular line contact is capable of providing an actuator with an especially stiff kinematic joint between the deformable face plate 22 and the backing plate 24.

In the prior art configuration illustrated in FIG. 1, by comparison, it is virtually impossible to ensure that each flat end 27 of the actuator 26 is perfectly flush with the back side 21b of the face plate. Therefore, there is likely to be considerable distance between portions of the flat end 27 and the back side 21b in the prior art, which has to be filled with an epoxy connection 31. Although this epoxy connection can support considerable force, since epoxy deforms considerably under force, the joint between the actuator and the back side 21b in the FIG. 1 prior art is more compliant (providing a lower spring constant) than desired. Additionally, the expansion and contraction of any actuator member which is angled with respect to another provides an increased stress to the deformable face plate.

Although any suitable ball segment adhesion technique can be used, two are utilized in the FIG. 2B embodiment of the present invention. The first adhesion joint is frit which is used to secure those joints which are intended to be permanent. Permanent adhesion joints are defined as those joints which are not intended to be removed during the normal life of the mirror assembly. The second adhesion joint is epoxy, which is used to secure those joints that are temporary. Epoxy is used to connect those elements which may have to be separated during the lifetime of the mirror assembly 20 to permit removal of the actuator.

Even though this disclosure describes the use of frit in permanent joints compared to the use of epoxy in temporary joints, it is desired that the present invention be interpreted more broadly. The frit joints relate to the joints which are intended to remain intact after some temperature, photonic, electrical, or chemical process is complete; and the epoxy joints relate to those joints which do not remain intact after the same temperature, photonic, electrical, or chemical process is complete. Therefore, after the broadly encompassing process is performed, the frit joints will remain intact, and the epoxy joints release.

Figure 5:
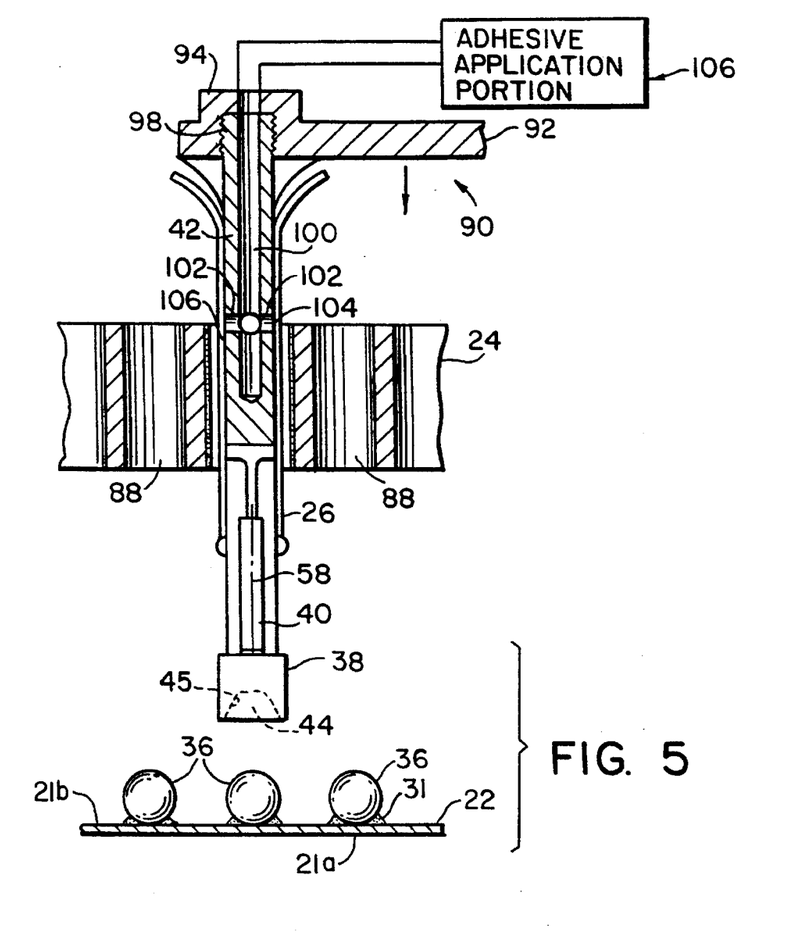
FIG. 5 is a partial cross sectional view of an assembly step used to produce the FIG. 2B mirror assembly 20, with the actuator being mounted in cylindrical apertures 88 of the backing portion 24 using one embodiment of the insertion technique.

The cylinder portion 42 of the actuator 26 is formed with an attachment section 98 (typically threads can be used) which permit securement by the actuator securement portion 94. While the threads are illustrated in FIG. 5 as being external, they may also be internal threads formed within a recess formed in the cylinder. This thread is not used to secure the actuator to the backing plate in the assembled mirror. When the actuator securement portion 94 is securing the attachment section 98 of the cylinder portion 42, first adhesive conduit 100 of the adhesive application portion 96 extends through the insertion rig 90 in fluid communication with a second adhesive conduit 102 which is formed in the cylinder portion 42 (see FIG. 4E). An opening, or plurality of openings 104, in the second adhesive conduit 102, remotely located from the first adhesive conduit 100, is in communication with an outer periphery 106 of the cylindrical portion. Temporary adhesive (e.g. epoxy) is applied from an adhesive dispensing device 106 through the first adhesive conduit 100, then through the second adhesive conduit 102 out of the opening(s) 104. When the adhesive exits the openings 104 in sufficient quantities, the adhesive (when it hardens) forms a secure joint between the cylindrical portion 42 and a wall of the cylindrical aperture 88 formed in the backing plate 24. As soon as the actuator 26 is in place via the epoxy and frit, as shown in the FIG. 2B embodiment, the attachment section 90 may be removed by unscrewing it from the threads. The insertion process is illustrated schematically in FIG. 4H, and structurally in FIG. 5.

The insertion rig shown in FIG. 5 contains a displacement rig 92, an actuator securement portion 94, and an adhesive application portion 96. The threads 98 in the FIG. 5 embodiment are utilized to affix the attachment section 90 to the actuator 26, instead of positioning the actuator 26 to its mount as is the case of the above described Ealey patents.

The displacement rig 92 may be displaced in any direction or rotated about any of the three orthogonal axes, and mounted in any position. It is important that the displacement rig be configured so as not to damage, obstruct, or be obstructed by any previously inserted actuators while inserting a given actuator. During insertion, the displacement rig positions the actuator into the cylindrical aperture 88 in such a position that the ball segments 36 are in contact with the recess 44 of the socket portion 38 with no excessive pressure being applied to any of the relevant members, thus providing the kinematic joint. The displacement rig 92 secures the actuator in position during insertion, but not during hardening of the epoxy.

FIG. 4I illustrates the further polishing of the front side 21a of the face plate 22. This continuous polishing utilizes a fixture arrangement to support the mirror assembly during polishing. FIG. 4J illustrates the electrical connection of the conductors 68 which are connected to the piezoelectric drivers 64, as well as the conductors 72 which are connected to the strain gages. Opposed ends of conductors 68 and 72 are connected to an electronic connector portion 110. The electronic connector utilizes circuitry of a known type to control the electronic aspects of the face plate. FIG. 4J illustrates the connection between the controller and the electronic connector portion 110.

One advantage of the embodiment of the actuator assembly shown in FIG. 2B is that all of the conductors 68, 72 extend through axially extending slits 112 formed in the cylinder portion 42 and exit out the top of the backing plate. Therefore, when an actuator is being removed, it is very easy to locate these conductors associated with any particular actuator. This compares to the FIG. 1 prior art configuration where all of the conductors become jumbled between the backing plate 24 and the face pate 22, and locating any one conductor becomes a major challenge.

Removal of Actuator Assembly

In order to describe the removal process of the actuators, it is necessary to initially to describe certain preferred characteristics of the adhesives which secure the actuators as the adhesives are forming their bond. In one embodiment, the frit 31 remains solid up to a temperature of approximately 1000 degrees Fahrenheit. The epoxy joints are secure for up to a temperature of approximately 300–400 degrees Fahrenheit. Therefore, if an actuator 26 to be removed and replaced is raised to a temperature between approximately 400 and 600 degrees Fahrenheit, the epoxy (temporary) bonds release while the frit bond remains intact. Then the actuators can be removed and replaced as described below by breaking the temporary joints as the permanent frit joints remaining intact.

Figure 6:
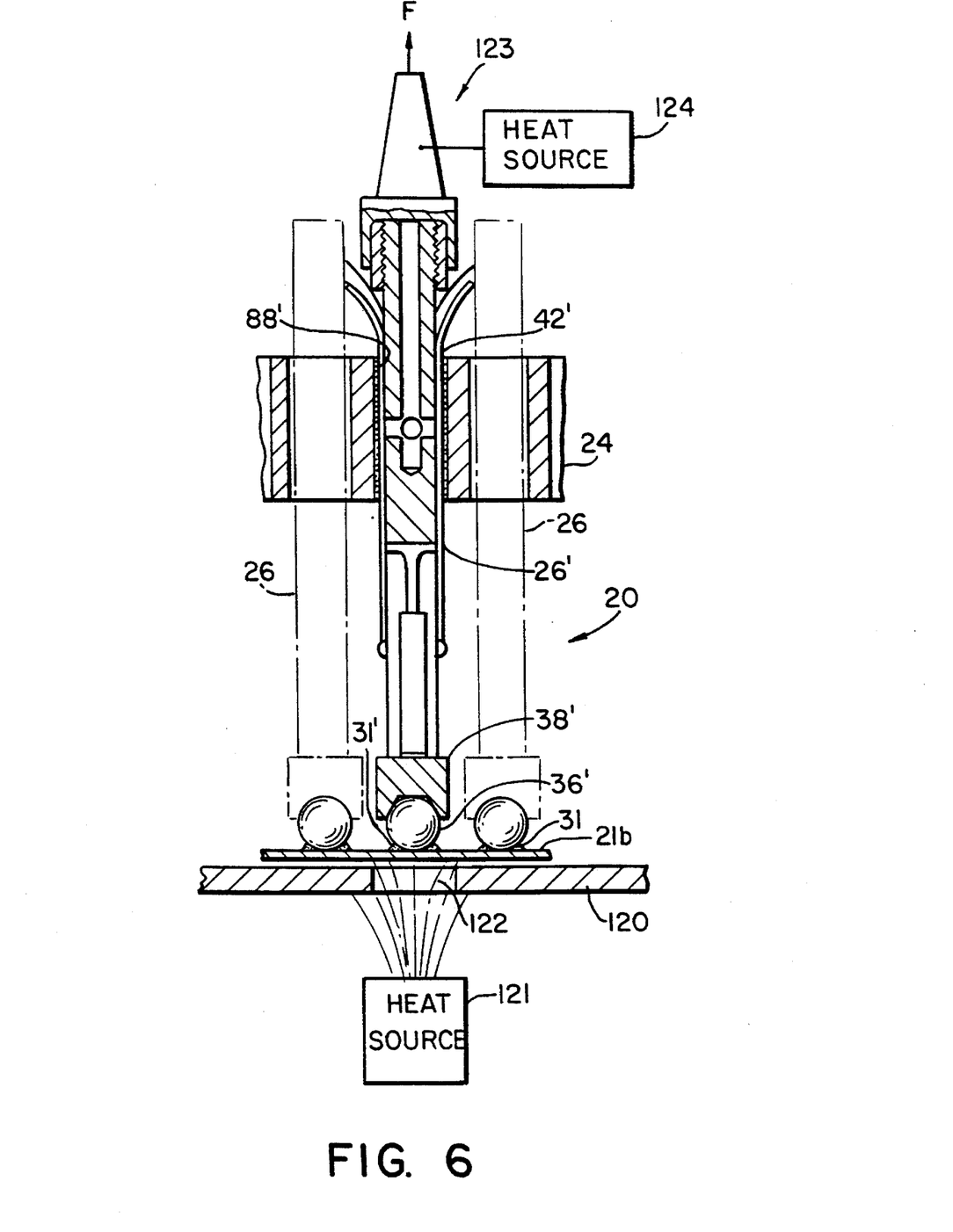
FIG. 6 is a partial cross sectional view of the mirror assembly of FIG. 2B, in which one of the actuators 26' is being prepared to be removed from the mirror assembly utilizing one embodiment of removal technique of the present invention.

FIG. 6 illustrates a partial cross sectional view of one embodiment of actuator 26 which has been found to be defective and needs to be removed from the mirror assembly 20. A heat protective mask 120 is placed at the front side of the face plate which has an opening 122 corresponding to the area through which the heat is applied. The opening is placed adjacent the face plate 22 in close proximity to a specific ball segment 36' which corresponds to actuator 26' which has been found defective. A first heat source 121, such as a heat blower, is then applied to the heat protective mask 120 to direct heat through the opening 122. Additionally, a heat application segment 123 is connected to the attachment section 98 (usually a threaded portion) of the cylindrical portion 42. A second heat source 124, such as a soldering iron, is applied to the heat application segment 123. The combination of the first heat source 121 and the second heat source 124 provides enough heat to the defective actuator 26 to weaken the two temporary epoxy bonds. The first epoxy bond is that bond located between the socket portion 38 and the ball segment 36, and the second epoxy bond is that bond located between the cylinder portion 42 and the cylindrical aperture 88 of the backing plate 24. The combination of the first heat source 121 and the second heat source 124 do not, however, provide sufficient heat to the actuator to weaken the frit bond between the ball segment 36 and the back side 21b of the face plate. As soon as the two epoxy bonds are weakened sufficiently by the application of the heat sources, the faulty actuator 26 can be removed from the backing plate by pulling the cylinder in an upwardly direction as illustrated in FIG. 6 by pliers, or another suitable device.

In the present invention, the problems which are associated with the Ealey patents (as described in the Background) are minimized. The hysteresis between motion provided in the actuator 26, and the resultant lost motion between the face plate and the backing plate is limited in the present invention. The actuator can also be more accurately located with respect to the face plate than in the prior art systems. The spring constant of the present invention is higher than the prior art systems. In brief, the present invention provides a more kinematic stress and strain free mount for actuators of mirror assembling than the systems illustrated in either the Ealey patents, or the FIG. 1 configuration.

While the invention has been particularly shown and described with respect to a preferred embodiment thereof, it will be understood by those skilled in the art that changes in form and details may be made therein without departing from the scope and spirit of the invention.

What is claimed is:

1. A deformable mirror assembly, comprising:

a deformable face plate;

a backing plate spaced from said deformable face plate;

at least one axially extendable actuator, fixed adjacent a first end to said backing plate, and at a second end, which is opposed to said first end, to said face plate by a kinematic joint such that no substantial forces are transmitted to said face plate by reason of said joint, said actuator being selectively removable from said assembly without causing deformation of said face plate.

2. The mirror assembly as described in claim 1 wherein said actuator is held within an opening formed in said backing plate.

3. The mirror assembly as described in claim 2 wherein said actuator, when removed, is retractable from within said opening in a direction opposed to said face plate.

4. The mirror assembly as described in claim 2 wherein said actuator is affixed within said opening by an adhesive.

5. The mirror assembly as described in claim 4 wherein epoxy is used to affix said actuator within said opening.

6. The mirror assembly as described in claim 1 wherein said actuator further comprises a stack which may be controllably extended or retracted.

7. The mirror assembly as described in claim 6 wherein said kinematic joint includes at least one frit joint, and at least one epoxy joint.

8. The mirror assembly as described in claim 7 wherein said kinematic joint comprises:

at least one high temperature joint and at least one low temperature joint.

9. The mirror assembly as described in claim 7 wherein said kinematic joint comprises:

at least one permanent joint and at least one temporary joint.

10. The mirror assembly as described in claim 7 wherein said kinematic joint further comprises:
a ball segment mounted on said face plate and a socket portion on said actuator which is configured to establish a line contact with said ball segment when placed in contact with said ball segment.

11. The mirror assembly as described in claim 10 wherein said line contact is substantially circular in configuration.

12. The mirror assembly as described in claim 11 wherein said ball segment is affixed to said deformable face plate.

13. The mirror assembly as described in claim 11 wherein said ball segment is affixed to said deformable face plate by frit.

14. The mirror assembly as described in claim 11 wherein an attachment adjacent said first end remains after the attachment at said second end, an attachment between said ball segment and said socket portion, is removed.

15. The mirror assembly as described in claim 1 further comprising:
means for applying cooling fluid to said actuator.

16. A method for connecting one or more actuators between a face plate and a backing plate, comprising the steps of:
affixing a ball segment to the face plate;
affixing an actuator at a first end to the ball segment by a kinematic joint such that no substantial forces are transmitted to the face plate by reason of the joint; and
affixing a second end of the actuator to the backing plate, said second end being remote from the first end.

17. The method as described in claim 16 further comprising the steps of:
forming a permanent bond between the face plate and the ball segment.

18. The method as described in claim 17 wherein the permanent bond is formed from frit.

19. The method as described in claim 16 further comprising:
forming a first temporary bond which affixes the first end to the ball segment.

20. The method as described in claim 19 wherein the first temporary bond is an epoxy bond.

21. The method as described in claim 16 further comprising the step of:
forming a second temporary bond which affixes the second end to the backing plate.

22. The method as described in claim 21 wherein the second temporary bond is an epoxy bond.

23. A deformable mirror assembly comprising:
a deformable face plate;
a backing plate, spaced from said deformable face plate;
a ball segment fixedly secured to said face plate; and
at least one axially extendable actuator, fixed adjacent a first end to said backing plate, and at a second end, which is opposed to said first end, to said ball segment.

24. The deformable mirror assembly as described in claim 23 wherein at least a portion of said actuator may be removed and replaced.

25. The deformable mirror assembly as described in claim 23 wherein said actuator and said ball segment form a kinematic joint between said backing plate and said face plate.

26. The deformable mirror assembly as described in claim 23 further comprising:
a permanent bond which is formed between said face plate and said ball segment.

27. The deformable mirror assembly as described in claim 26 wherein said permanent bond is formed from frit.

28. The deformable mirror assembly as described in claim 23 further comprising:
a first temporary bond which is formed between said ball segment and said actuator.

29. The deformable mirror assembly as described in claim 28 wherein said first temporary bond is an epoxy bond.

30. The deformable mirror assembly as described in claim 23 further comprising:
a second temporary bond which is formed between said actuator and said backing plate.

31. The deformable mirror assembly as described in claim 30 wherein said second temporary bond is an epoxy bond.

32. A method for connecting one or more actuators between a face plate and a backing plate, comprising the steps of:
forming a first joint of a first member to said face plate, said first joint being permanent;
forming a second joint between said actuator and said first member, said second joint being temporary, said second joint being a kinematic joint such that no substantially forces are transmitted between said actuator and said first member by reason of said joint; and
forming a third joint between said actuator and said backing plate, said third joint being temporary.

33. The method as described in claim 32 wherein the permanent joint is formed of frit and the temporary joints are formed of epoxy.

34. The method as described in claim 32 wherein the permanent joint can withstand certain elevated temperatures, while the temporary joints cannot withstand such elevated temperatures.

* * * * *